US012780420B2

(12) United States Patent
Van Schaik

(10) Patent No.: US 12,780,420 B2
(45) Date of Patent: Nov. 3, 2026

(54) MOVEMENT TRANSMISSION DEVICE AND A SEAT

(71) Applicant: SAFRAN ELECTRONICS & DEFENSE, Paris (FR)

(72) Inventor: Jeroen Robbert Van Schaik, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 137 days.

(21) Appl. No.: 18/874,323

(22) PCT Filed: Jun. 12, 2023

(86) PCT No.: PCT/FR2023/050840

§ 371 (c)(1),
(2) Date: Dec. 12, 2024

(87) PCT Pub. No.: WO2023/242504

PCT Pub. Date: Dec. 21, 2023

(65) Prior Publication Data

US 2025/0353597 A1 Nov. 20, 2025

(30) Foreign Application Priority Data

Jun. 14, 2022 (FR) ........................................ 2205726

(51) Int. Cl.
*B64D 11/06* (2006.01)

(52) U.S. Cl.
CPC .... *B64D 11/0619* (2014.12); *B64D 11/06395* (2014.12); *B64D 11/064* (2014.12)

(58) Field of Classification Search
CPC .......... B64D 11/0619; B64D 11/06395; B64D 11/064; F16C 2229/00; F16C 2326/43;
(Continued)

(56) References Cited

U.S. PATENT DOCUMENTS 7,839,039 B2 * 11/2010 Matsubara ............ F16C 25/083 310/90
2019/0048961 A1 * 2/2019 Fox ......................... F16H 19/04
(Continued)

FOREIGN PATENT DOCUMENTS

WO 2021099737 A1 5/2021

OTHER PUBLICATIONS

International Search Report in corresponding PCT Application No. PCT/FR2023/050840, mailed Aug. 10, 2023, 4 pages.

*Primary Examiner* — Ahmed Elnakib
(74) *Attorney, Agent, or Firm* — Cozen O'Connor

(57) ABSTRACT

A movement transmission device having a first assembly including a housing extending along a first axis, a second assembly configured to move in rotation and in translation along the first axis inside the housing, and a first elastic member. The first assembly includes a first axial stop and the second assembly includes a complementary first axial stop, a first axial clearance being formed between the first axial stop and the complementary first axial stop. The first elastic member is adapted to be deformed during translational movement of the second assembly along the first axis when an axial force greater than a first threshold is applied, the complementary first axial stop being axially supported by the first axial stop.

10 Claims, 5 Drawing Sheets

(58) Field of Classification Search
CPC .. F16C 2380/27; F16C 19/163; F16C 19/184; F16C 19/548; F16C 31/04; F16C 35/067
USPC ........................................................ 310/49.18
See application file for complete search history.

(56) References Cited

U.S. PATENT DOCUMENTS

| | | | | |
|---|---|---|---|---|
| 2022/0314849 | A1* | 10/2022 | Malapati | B60N 2/4228 |
| 2025/0108921 | A1* | 4/2025 | Van Schaik | F16C 35/067 |
| 2025/0353597 | A1* | 11/2025 | Van Schaik | F16C 31/04 |

* cited by examiner

MOVEMENT TRANSMISSION DEVICE AND A SEAT

CROSS-REFERENCE TO RELATED APPLICATIONS

This application is a US National phase Application of PCT/FR2023/050840 filed Jun. 12, 2023, which claims priority to French Patent Application No. 2205726 filed Jun. 14, 2022, both of which are hereby incorporated in their entirety.

TECHNICAL FIELD

This disclosure relates to a movement transmission device and to a seat comprising said device.

BACKGROUND

In the field of passenger transport, particularly air transport, it is known to equip aircraft with seats for transporting passengers in a seated position. Each seat comprises a plurality of elements, for example a backrest, a seating portion, a headrest, one or more armrests, etc.

In order to improve passenger comfort, each seat may be equipped with one or more actuators for moving the seat relative to the floor on which it is installed, or for moving various elements of the seat relative to other elements.

Generally, the actuator comprises an output shaft, a motor, and a brake. The output shaft is connected to the seat or to the element of the seat to be moved. The motor is adapted to (able to) drive the output shaft in translation and/or in rotation in order to cause a simultaneous movement of the seat or of the corresponding seat element. The brake is used to lock the output shaft in position, thereby preventing the seat or the corresponding element thereof from moving when the motor is not activated.

The actuator further comprises a reduction gear train connecting the brake and the output shaft. The reduction gear train comprises a set of mechanical parts, such as racks, pinions, connecting rods, etc.

In certain situations, significant forces are produced within the actuator. These forces are transmitted between the output shaft and the brake, through the reduction gear train, and result in wear or even breakage of the brake. The seat and/or the respective seat elements may then move in an uncontrolled manner. Such situations occur, for example, in the event of an abrupt stop in the movement of the seat or of one of its elements, or when a passenger drops forcefully onto the seat. This situation also occurs in the event of an emergency landing of the aircraft, during which the actuator is subjected to very high forces, generally known as “crash forces”.

Conventionally, in order to reduce the risks of brake wear and breakage, the mechanical parts of the reduction gear train are overdesigned. However, such overdesigning increases both the manufacturing cost of the actuator and the weight of the aircraft. Furthermore, the forces that occur within the actuator during the situations indicated above are difficult to model accurately, such that overdesigning the mechanical parts of the reduction gear train may be insufficient to avoid brake wear or breakage.

SUMMARY

The present disclosure improves the situation.

To this end, a movement transmission device intended for an actuator is proposed, the device comprising:

- a fixed first assembly comprising a housing extending along a first axis;
- a second assembly arranged in said housing and extending along the first axis, the second assembly being configured to move in rotation about said first axis and to move in translation along said first axis, inside said housing;
- a first elastic member installed inside said housing;

wherein the first assembly comprises a first axial stop and the second assembly comprises a complementary first axial stop, the first axial stop and the complementary first axial stop being axially facing each other, a first axial clearance being formed between the first axial stop and the complementary first axial stop, wherein the first elastic member is able of being deformed during translational movement of the second assembly along the first axis in a first direction when an axial force greater than a first threshold is exerted by the second assembly on said first elastic member, the first axial clearance being progressively reduced until the complementary first axial stop is axially supported on the first axial stop.

In this description, the terms “axial”, “radial”, and “circumferential” are defined relative to the axis along which the housing of the first assembly extends. In particular, “axial” means along the axis of extension of the housing, or parallel to this axis, and radial means along any axis transverse or substantially transverse to the housing. “Circumferential” is understood to mean around the aforementioned axis or an axis parallel to it.

The actuator is for example a rotary type of actuator. The actuator may comprise a brake, a motor, and a reduction gear train which are housed in a casing.

The axial force exerted by the second assembly on the first elastic member may be generated by forces acting within the actuator. Also, due to the axial supporting of the complementary first axial stop which is part of the second assembly, on the first axial stop which is part of the first assembly, the forces within the actuator are dissipated through the first assembly of the transmission device. The percentage of the forces generated in the actuator that reach the brake is therefore reduced, or even zero. As a result, the risks of brake wear and/or breakage are limited with no need to overdesign the parts of the reduction gear train, which allows reducing the manufacturing cost of the actuator and its weight.

In order to further increase the dissipation of forces, at least one among the first axial stop and the complementary first axial stop may comprise a friction surface comprising roughnesses and/or axially projecting elements, for example a dog system.

Furthermore, as the deformation of the first elastic member during translation of the second assembly along the first axis takes place when an axial force greater than the first threshold is exerted by the second assembly on said first elastic member, it is possible to define at which level of force acting within the actuator the proposed device starts operating when the second assembly is moved axially in the first direction. This prevents the transmission device from being activated when the forces in the actuator offer no threat to the integrity of the brake. It should be noted that the first threshold in the present text corresponds for example to the maximum axial force that can be applied to the first elastic member without it being deformed. Preferably, the first threshold is between 10 N and 250 N. For example, the first threshold is equal to 60 N.

Finally, the proposed device has a limited number of parts, which interact with each other in a simple manner. The device is therefore simple to manufacture and occupies a reduced footprint.

The actuator comprising the transmission device is configured to move a seat, for example an aircraft seat, when it is activated. The transmission device may also be comprised in an actuator configured to move a part of the seat relative to the other parts of the seat, when activated. “Activated” is understood here to mean the forces which impart movement to the output shaft are generated within the actuator, whatever the intensity of these forces may be.

The actuator casing is connected to a fixed part of the seat or aircraft, i.e., to a part of the seat or aircraft that does not move when the actuator is activated. The actuator may further comprise an output shaft which passes through the casing. The output shaft extends along a longitudinal axis that is, for example, substantially parallel to the axis of extension of the housing of the first assembly. The output shaft moves in translation along its longitudinal axis, or in rotation about this longitudinal axis, when the actuator is activated. The output shaft may be connected to the seat so as to cause a movement of the seat simultaneously with the movement of the output shaft when the actuator is activated. Alternatively, the output shaft may be connected to a movable part of the seat, i.e. to a part of the seat that moves when the actuator is activated. This movable part is then moved simultaneously with the movement of the output shaft. The movement of the seat or of part of the seat may be integral with the movement of the output shaft. “Integral” is understood here to mean that the movement of the seat or of part of the seat is of the same type as the movement of the output shaft and in a direction substantially parallel to the movement of the output shaft. The movement of the seat or of part of the seat may therefore be a movement in translation and/or in rotation.

When the brake of the actuator is engaged, movement of the output shaft may be prevented. In particular, the brake is engaged when the actuator is deactivated. “Deactivated” is understood to mean that the actuator is not activated, no force able of moving the output shaft being generated within the actuator.

The transmission device may be comprised in the reduction gear train of the actuator.

As indicated above, the first assembly of the transmission device is fixed. “Fixed” is understood here to mean that the first assembly comprises a set of parts of this device which are immobile when the transmission device is operating. The first assembly may comprise a portion of the actuator casing. In particular, the housing of the first assembly may correspond to a housing of the actuator casing. The first axial stop may be part of the casing. For example, the first axial stop may be comprised in a radially internal wall of the casing defining the housing.

The housing may comprise a first end and a second end which are axially opposite. In one example, the first and second ends of the housing are open ends. In another example, at least one among the first and second ends of the housing is closed off by an end wall. The end wall may be a wall of the casing extending substantially in the radial direction.

As for the second assembly, it comprises parts of the transmission device which are able of movement in rotation about the first axis and/or movement in translation along this first axis, as will be detailed below.

The first elastic member is for example a wave spring. Alternatively, the first elastic member is a wire-type spring, a spiral spring, or an elastic washer, for example a Belleville washer. The first elastic member preferably has a substantially annular cross-section, its opening or cavity extending substantially axially along the elastic member.

The deformation of the first elastic member under the effect of the axial force exerted by the second assembly on the first elastic member comprises, for example, an axial compression of the first elastic member.

According to one aspect, the second assembly may comprise at least one shaft and one helical pinion which are integral with each other, the helical pinion comprising the complementary first axial stop and meshing with a complementary input pinion of the device.

The shaft of the second assembly extends along a longitudinal axis which is, for example, substantially parallel to the axis of extension of the housing of the first assembly.

The helical pinion has for example a substantially annular shape comprising a hole, for example centered in the helical pinion. The helical pinion further comprises a radially external crenellated face, meaning it comprises a plurality of teeth distributed circumferentially on this radially external face. A helical pinion corresponds here to a pinion in which each tooth of its radially external face is arranged so as to form an angle that is not 0° or 90° with the longitudinal axis of the shaft of the second assembly, referred to as a helix angle. In the present case, the helix angle of the helical pinion of the second assembly may be between 5° and 50°, preferably between 15° and 30°.

In order to make the shaft of the second assembly and the helical pinion integral with each other, the shaft may be press-fitted or adjusted to fit tightly into the hole of the helical pinion. The helical pinion is thus arranged around the shaft of the second assembly.

The input pinion, also referred to as the upstream pinion, may also be a helical pinion having a substantially annular shape comprising a hole, for example centered in the input pinion. The input pinion also comprises a radially external crenellated face. To be complementary to the helical pinion of the second assembly, the helix angle of the input pinion is equal to the helix angle of the teeth of the helical pinion of the second assembly, but in the opposite direction.

The input pinion may be connected to the motor of the actuator by an input shaft, also called the drive shaft. The drive shaft extends along a longitudinal axis which may be substantially parallel to the axis of extension of the housing of the first assembly. The input pinion and the drive shaft are advantageously integral with each other. In particular, the drive shaft may be press-fitted or adjusted to fit tightly into the hole of the input pinion. Alternatively, a set of mechanical parts is interposed between the input pinion and the drive shaft, this set of mechanical parts acting as an overload brake.

When the actuator is activated, the motor drives the drive shaft to rotate about its longitudinal axis. The input pinion is thus rotated about the longitudinal axis of the drive shaft. The input pinion being complementary to the helical pinion of the second assembly, the torque causing rotation of the input pinion is transmitted to the helical pinion of the second assembly. The helical pinion is therefore driven by the input pinion to rotate about the longitudinal axis of the shaft of the second assembly, which preferably is parallel to the longitudinal axis of the drive shaft.

As the input pinion and the pinion of the second assembly are helical pinions having the same helix angle, the meshing of teeth between the input pinion and the pinion of the second assembly is helical. Helical meshing generates an axial force on the interacting pinions when torque is transmitted between these pinions. In particular, the axial force is generated by the contact forces generated between the two meshing pinions when they rotate. This axial force is proportional to the torque transmitted between the pinions. Therefore, the helical meshing between the input pinion and the pinion of the second assembly implies that when the input pinion rotates about the longitudinal axis of the input shaft, the pinion of the second assembly also rotates about the longitudinal axis of the shaft of the second assembly. The rotation of these two pinions generates the axial force which moves the shaft of the second assembly in translation along its longitudinal axis. The drive shaft may also be moved in translation along its longitudinal axis in a direction opposite to that of the translation of the shaft of the second assembly.

As the complementary first axial stop is comprised in the pinion of the second assembly, the movement in translation of the shaft of the second assembly along its longitudinal axis makes it possible to progressively reduce the first axial clearance, until the complementary first axial stop comes into contact with the first axial stop of the first assembly. The forces exerted on the actuator are therefore dissipated through the first assembly.

One will note that the movement of the shaft of the second assembly in axial translation along the first direction takes place only when the axial force generated on the pinions is greater than the first threshold presented above.

One will also note that for the shaft of the second assembly to be able to move in axial translation along the first direction, the axial opening or cavity of the first elastic member preferably has a diameter greater than a diameter of the shaft of the second assembly.

The second assembly may further comprise a second pinion integral with the shaft of the second assembly and meshing with a complementary output pinion of the device.

The second pinion of the second assembly may also have an annular shape comprising a hole and a radially external crenellated face. The diameter of the second pinion may be equal to or different from the diameter of the other pinion of the second assembly.

According to one example, the second pinion of the second assembly may be a spur pinion, meaning a pinion in which the teeth of the radially external face are oriented so they are parallel or perpendicular to the longitudinal axis of the shaft of the second assembly. In other words, in a spur pinion, the teeth of the radially external face of the pinion form an angle equal to 0° or 90° with the longitudinal axis of the shaft of the second assembly. According to another example, the second pinion is a helical pinion, its helix angle equal to or different from the helix angle of the other helical pinion of the second assembly.

The output pinion, also called the downstream pinion, may also have a substantially annular shape comprising a hole, for example centered in the output pinion. The output pinion may comprise a radially external crenellated face as well. To be complementary to the second pinion of the second assembly, the teeth on the radially external face of the output pinion have an orientation substantially equal to that of the teeth on the radially external face of the second pinion. Also, if the second pinion of the second assembly is a spur pinion, the output pinion is also a spur pinion. Conversely, if the second pinion of the second assembly is a helical pinion, the output pinion is a helical pinion in which the helix angle of the teeth is equal to the helix angle of the teeth of the second pinion of the second assembly.

The output pinion may be connected to the movable part of the seat via the output shaft of the actuator. The output pinion and the output shaft are integral with each other. In particular, the output shaft may be press-fitted or adjusted to fit tightly into the hole of the output pinion.

When the actuator is activated, the shaft of the second assembly is, as indicated above, driven to rotate about its longitudinal axis. As the second pinion of the second assembly is integral with the shaft of the second assembly, it is also driven to rotate about the longitudinal axis of the shaft of the second assembly. The complementarity between the second pinion of the second assembly and the output pinion implies that the output pinion also rotates about the longitudinal axis of the output shaft when the second pinion of the second assembly rotates.

When the two pinions of the second assembly are helical with helix angles in opposite directions, the axial force which enables axial movement of the second assembly is higher than in any other configuration of the pinions of the second assembly. The complementary first axial stop therefore bears more strongly against the first axial stop than in any other configuration of the pinions of the second assembly, which makes it possible to dissipate more effectively, through the first assembly, the forces to which the actuator is subjected. If only one of the pinions of the second assembly is helical, the dissipation of forces through the first assembly is more effective if the helical pinion is the one with a smaller diameter. In particular, at identical torque and helix angle, the axial force produced by the helical meshing is greater when the diameter of the helical pinion decreases.

According to one aspect, a first bearing may be mounted in the housing, radially between the first assembly and the second assembly, the first bearing comprising a radially external ring arranged facing the first assembly and a radially internal ring arranged facing the second assembly, the first elastic member being axially supported (coming to bear axially) on the radially external ring of said first bearing.

The radially internal and radially external rings of the first bearing preferably have a generally cylindrical shape and are coaxial with each other. A plurality of rolling elements may be arranged between the radially internal ring and the radially external ring of the first bearing.

The first bearing may be arranged around a first end portion of the shaft of the second assembly, the radially internal ring and the radially external ring of the first bearing being coaxial around the longitudinal axis of the shaft of the second assembly.

The radially internal ring of the first bearing may be integral with the shaft of the second assembly. Thus, when the second assembly moves axially and/or rotates about the longitudinal axis of its shaft, the radially internal ring of the first bearing moves and/or rotates integrally with the second assembly.

The axial force associated with the axial movement of the radially internal ring of the first bearing is transmitted to the radially external ring of the first bearing through the plurality of rolling elements. If this axial force is greater than the first threshold described above, the radially external ring of the first bearing is also moved axially and the first elastic member is compressed. If the axial force transmitted to the radially external ring of the first bearing is less than the first threshold, the radially external ring of the first bearing is not moved axially and the first elastic member is not compressed. Indeed, as the first elastic member is axially supported on the radially external ring of the first bearing, elastic energy stored in the first elastic member opposes the axial movement of the radially external ring of the first bearing as long as the axial force transmitted to this radially external ring is not greater than the first threshold. The elastic energy stored in the first elastic member corresponds to the elastic energy associated with the axial force corresponding to the first threshold described above.

One will note that the axial support of the first elastic member on the radially external ring of the first bearing may be a direct or indirect support. "Direct support" is understood to mean that the radially external ring of the first bearing and the first elastic member are in contact with each other. "Indirect support" is understood to mean that at least one axially movable part is interposed between the radially external ring of the first bearing and the first elastic member. In some cases, only the radially external periphery of the first elastic member is axially supported on the radially external ring of the first bearing.

According to one aspect, the first assembly may comprise a first shoulder and the second assembly may comprise a complementary first shoulder, the radially external ring of the first bearing being axially supported on the first shoulder of the first assembly, the radially internal ring of the first bearing being axially supported on the complementary first shoulder of the second assembly.

The first shoulder and the complementary first shoulder may be radially facing each other.

The first shoulder may be comprised in the casing. The first shoulder may comprise an annular axial support face for the radially external ring of the first bearing. This annular face of the first shoulder is shaped to be axially facing the radially external ring of the first bearing. The annular face of the first shoulder extends for example radially in the direction of the complementary first shoulder.

The complementary first shoulder may be comprised in the shaft of the second assembly. The complementary first shoulder may comprise an annular axial support face for the radially internal ring of the first bearing. This annular face of the complementary first shoulder is shaped to be axially facing the radially internal ring of the first bearing. The annular face of the complementary first shoulder may extend radially in the direction of the first shoulder.

The annular faces of the first shoulder and the complementary first shoulder may be aligned in the radial direction when the transmission device is at rest (i.e. when no axial force is exerted by the second assembly).

The axial support of the radially external ring and the radially internal ring of the first bearing, respectively by the first shoulder and the complementary first shoulder, may be a direct or an indirect support. "Direct support" is understood to mean that the radially external ring and the radially internal ring are in contact with the first shoulder and the complementary first shoulder respectively. "Indirect support" is understood to mean that at least one part is interposed between the radially external ring of the first bearing and the first shoulder, and between the radially internal ring of the first bearing and the complementary first shoulder.

By means of the first shoulder and the complementary first shoulder, it is possible to position the first bearing easily in its installation position around the shaft of the second assembly. "Installation position" is understood here to mean the position of the first bearing when the proposed device is functional but at rest. Furthermore, the complementary first shoulder makes it possible to transmit, to the radially internal ring of the first bearing, the axial force associated with the axial translation of the second assembly, even if a radial clearance exists between the shaft of the second assembly and the first bearing. Also, the radially internal ring of the first bearing can move integrally with the second assembly, even in the presence of such a radial clearance. As explained above, the axial force is transmitted through the rolling elements to the radially external ring of the first bearing and, if this axial force is greater than the first threshold described above, the radially external ring of the first bearing can also move axially so as to compress the first elastic member.

According to another aspect, the device may further comprise a first preload element for the first elastic member, adapted to adjust an axial preload force acting on the first elastic member.

The first preload element may be part of the first assembly of the device.

The axial preload force acting on the first elastic member defines the first threshold beyond which the first elastic member is deformed during axial translation of the second assembly in the first direction. In particular, the value of the axial preload force of the first elastic member is equal to the first threshold. In other words, the higher the axial preload force on the first elastic member, the higher the axial force exerted by the second assembly on the first elastic member must be in order for the first elastic member to be deformed and for the second assembly to be able to move axially in the first direction.

The first preload element may be in contact with a radially external and/or internal periphery of the first elastic member.

The first preload element may be a threaded plug comprising, on a radially external surface, a thread complementary to a threaded hole provided in the housing of the first assembly. Alternatively, the first preload element may be a nut comprising, on a radially external surface, a thread complementary to the threaded hole provided in the housing of the first assembly. Alternatively, the first preload element may be a plate connected directly to the first assembly, preferably by means of a removable connection. The plate may be for example screwed onto the first assembly so as to be in contact with the first elastic member.

Regardless of the type of first preload element, it may traversed by a hole or an axial cavity sized to allow axial movement of the shaft of the second assembly through this hole or cavity.

In certain cases, it is possible to modify the axial preload force on the first elastic member by moving the first preload element in the housing. In particular, the first preload element may be moved in the housing in a direction towards the first elastic member, so as to compress it, which increases the axial preload force. Similarly, the first preload element may be moved in the housing in a direction away from the first elastic member, so as to relax it, which reduces the axial preload force. This modification of the axial preload force on the first elastic member is possible in particular when the first preload element is a threaded plug or a nut as described above.

In other cases, the first preload element is sized so that the first elastic member is subjected to a precise value of axial preload force when the first preload element is installed in the movement transmission device. Such cases occur in particular when the first preload element is a plate as described above. In these cases, the first shoulder of the first assembly may be comprised in the plate, the axial length of the first shoulder being a function of the axial preload force to be induced in the first elastic member.

According to one example, in particular when the housing is open at both of its ends, the first elastic member may be arranged directly between the first preload element and the first bearing. According to another example, in particular when the housing is closed off by an end wall at at least one of its ends, the first elastic member may be arranged directly between the first bearing and the end wall.

According to one aspect, the device may further comprise a second elastic member installed inside the housing, wherein the first assembly comprises a second axial stop and the second assembly comprises a complementary second axial stop, the second axial stop and the complementary second axial stop being axially facing each other, a second axial clearance being formed between the second axial stop and the complementary second axial stop, wherein the second elastic member is adapted to be deformed during translational movement of the second assembly along the first axis in a second direction that is opposite the first direction when an axial force greater than a second threshold is exerted by the second assembly on said second elastic member, the second axial clearance being progressively reduced until the complementary second axial stop is axially supported on the second axial stop.

The presence of the first elastic member and the second elastic member which are adapted to be deformed under the effect of axial forces oriented in opposite directions allows the transmission device to constitute a two-way brake able of damping the forces undergone by the actuator even in the event of seat rebound and independently of the direction of installation of the transmission device in the seat. In particular, the axial support of the second axial stop by the complementary second axial stop, which takes place when the second assembly moves in the second direction opposite to the first direction, the dissipation of the axial force which drives the second assembly in translation along the first axis may be dissipated through the first assembly in this configuration regardless of the direction of axial movement of the first assembly. In order to increase the dissipation of forces, at least one among the second axial stop and the complementary second axial stop may comprise a friction surface having roughnesses and/or axially projecting elements, for example a dog system.

Furthermore, as the deformation of the second elastic member during translational movement of the second assembly along the first axis in the second direction takes place when an axial force greater than the second threshold is exerted by the second assembly on said second elastic member, it is possible to define at which level of force acting within the actuator the proposed device begins to operate when the second assembly is moved axially in the second direction. This prevents the transmission device from being activated when the forces in the actuator present no threat to the integrity of the brake. One will note that the second threshold may be equal to or different from the first threshold. The second elastic member is for example a wave spring. Alternatively, the second elastic member is a wire-type spring, a spiral spring, or an elastic washer, for example a Belleville washer. The second threshold corresponds for example to the maximum axial force that can be applied to the second elastic member without it being deformed. Preferably, the second threshold is between 10 N and 250 N. For example, the first threshold is equal to 60 N.

One will note that the movement of the shaft of the second assembly in axial translation in the second direction takes place only when the axial force generated on the pinions is greater than the second threshold presented above.

The deformation of the second elastic member under the effect of the axial force exerted by the second assembly on the second elastic member comprises, for example, an axial compression of the second elastic member.

According to one aspect, the device may further comprise a second bearing mounted in the housing, radially between the first assembly and the second assembly, the second bearing comprising a radially external ring arranged facing the first assembly and a radially internal ring arranged facing the second assembly, the second elastic member being axially supported directly on the radially external ring of said second bearing.

The radially internal and radially external rings of the second bearing have, for example, a generally cylindrical shape and are coaxial with each other. A plurality of rolling elements may be arranged between the radially internal ring and the radially external ring of the second bearing.

The second bearing may be arranged around a second end portion of the shaft of the second assembly, the second end portion of this shaft being axially opposite the first end portion on which the first bearing is arranged. The radially internal ring and the radially external ring of the second bearing are coaxial around the longitudinal axis of the shaft of the second assembly.

The radially internal ring of the second bearing may be integral with the shaft of the second assembly. Thus, when the second assembly moves axially along and/or rotates about the longitudinal axis of its shaft, the radially internal ring of the second bearing moves and/or rotates integrally with the second assembly.

The axial force associated with the axial movement of the radially internal ring of the second bearing is transmitted to the radially external ring of the second bearing through the plurality of rolling elements. If this axial force is greater than the second threshold described above, the radially external ring of the second bearing is also moved axially and the second elastic member is compressed. If the axial force transmitted to the radially external ring of the second bearing is less than the second threshold, the radially external ring of the second bearing is not moved axially and the second elastic member is not compressed. Indeed, as the second elastic member is axially supported on the radially external ring of the second bearing, elastic energy stored in the second elastic member opposes axial movement of the radially external ring of the second bearing as long as the axial force transmitted to this radially external ring is not greater than the second threshold. The total elastic energy stored in the second elastic member corresponds to the elastic energy associated with the axial force corresponding to the second threshold described above. One will note that the axial supporting of the second elastic member by the radially external ring of the second bearing may be a direct support or an indirect support as described above. In certain cases, only the radially external periphery of the second elastic member being axially supported on the radially external ring of the second bearing.

According to one aspect, the first assembly may further comprise a second shoulder and the second assembly may further comprise a complementary second shoulder, the radially external ring of the second bearing being axially supported on the second shoulder of the first assembly, the radially internal ring of the second bearing being axially supported on the complementary second shoulder of the second assembly.

The second shoulder and the complementary second shoulder may be radially facing each other.

The second shoulder may be comprised in the casing. The second shoulder may comprise an annular axial support face for the radially external ring of the second bearing. This annular face of the second shoulder is shaped to be axially facing the radially external ring of the second bearing. The annular face of the second shoulder extends for example radially in the direction of the complementary second shoulder.

The complementary second shoulder may be comprised in the shaft of the second assembly. The complementary second shoulder may comprise an annular axial support face for the radially internal ring of the second bearing. This annular face of the complementary second shoulder is shaped to be axially facing the radially internal ring of the second bearing. The annular face of the complementary second shoulder may extend radially in the direction of the second shoulder.

The annular faces of the second shoulder and complementary second shoulder may be aligned in the radial direction when the transmission device is at rest.

The axial supporting of the radially external ring and the radially internal ring of the second bearing on the second shoulder and complementary second shoulder, respectively, may be a direct support or an indirect support as described above.

The presence of the first shoulder and second shoulder of the first assembly and the presence of the complementary first shoulder and complementary second shoulder of the second assembly allow separating the paths followed by the forces from the first and second elastic members, which allows the value of the first threshold and the value of the second threshold described above to be independent of each other and to be independently adjustable.

Furthermore, by means of the second shoulder and the complementary second shoulder, it is possible to position the second bearing easily in its installation position around the shaft of the second assembly. The complementary second shoulder also allows transmitting, to the radially internal ring of the second bearing, the axial force associated with axial translation of the second assembly, even if a radial clearance exists between the shaft of the second assembly and the second bearing. The radially internal ring of the second bearing may therefore move integrally with the second assembly, even in the presence of such a radial clearance. As explained above, the axial force is transmitted through the rolling elements to the radially external ring of the second bearing and, if this axial force is greater than the second threshold described above, the radially external ring of the second bearing may also move axially so as to compress the second elastic member.

According to one aspect, the device may further comprise a second preload element for the second elastic member, adapted to adjust an axial preload force acting on the second elastic member independently of the axial preload force acting on the first elastic member.

The first preload element and the second preload element therefore allow independently adjusting the preload force which acts on the first elastic member and on the second elastic member respectively. The preload forces acting on the first and second elastic members may therefore be different so that they do not cancel each other out. The transmission device therefore constitutes an operational two-way brake.

The second preload element may be part of the first assembly. The axial preload force acting on the second elastic member defines the second threshold beyond which the second elastic member is deformed during axial translation of the second assembly in the second direction. In particular, the value of the axial preload force of the second elastic member is equal to the second threshold. In other words, the higher the axial preload force of the second elastic member, the higher the axial force exerted by the second assembly on the second elastic member must be in order to deform the second elastic member and thus move the second assembly axially in the second direction.

The second preload element may be in contact with a radially external and/or internal periphery of the second elastic member. As with the first preload element, the second preload element may be a threaded plug, a nut, or a plate, having the features set forth above. When the second preload element is a plate, the second shoulder described above may be comprised in the plate.

As indicated above with reference to the first elastic member, certain types of second preload element allow modifying the axial preload force of the second elastic member by moving the second preload element in the housing in a direction towards the second elastic member. The second elastic member is thus compressed, which increases its axial preload force. Similarly, the second preload element may be moved in the housing in a direction away from the second elastic member so as to relax it, which reduces its axial preload force. One will note that the movements of the first and second preload elements are independent of each other, which makes it possible to apply a different preload force to each elastic member.

In other cases, the second preload element is sized so that the second elastic member is subjected to a precise value of axial preload force when the second preload element is installed in the movement transmission device.

According to one example, in particular when the housing has both of its ends open, the second elastic member may be arranged directly between the second preload element and the second bearing. According to another example, in particular when the housing has at least one of its ends closed off by the end wall, the second elastic member may be arranged directly between the second bearing and the end wall.

As indicated above, the first assembly is a set of parts of this device that are immobile when the transmission device is in operation. Also, when two elastic members are included in the device, the first assembly may comprise the casing, the first preload element, and the second preload element. The second assembly, as indicated, comprises parts of the transmission device that are able of rotation about the first axis and/or translation along this first axis. Also, in the case of a transmission device comprising two elastic members arranged as described above, the second assembly may comprise the shaft and the pinion(s) integral with the shaft, the first bearing, and the second bearing.

According to another aspect, a seat for an aircraft is provided, comprising a fixed part intended to be fixed to a fixed part of the aircraft and a movable part adapted to be moved relative to the fixed part, a movement transmission device according to the above-mentioned type being mounted between the movable part and the fixed part, the first assembly of the transmission device being connected to said fixed part of the seat, the second assembly of the transmission device being adapted to be driven by a motor to move in rotation about the first axis and to in translation along said first axis, the second assembly being connected to said movable part of the seat.

The movement transmission device imparts movement to the movable part of the seat which causes it to move relative to the fixed part of said seat. In particular, as explained above, the second assembly of the device is connected to the output shaft of the actuator. The movement of the second assembly causes movement of the output shaft, which will therefore move the movable part of the seat.

The fixed part of the seat may be connected directly or indirectly to the fixed part of the aircraft. The fixed part of the aircraft corresponds, for example, to the floor.

In some cases, the fixed and movable parts of the seat each correspond to one of the seat elements. In one non-limiting example, the movable part corresponds to the backrest of the seat, while the fixed part of the seat corresponds to the seating part, which is connected to the floor of the aircraft either directly or by means of feet.

Note that it is not excluded for the seat element which constitutes the fixed part of the seat in one given situation, to constitute the movable part of the seat in another situation. For example, the seating part which is connected to the floor by means of feet could move relative to the feet, the feet being comprised in the fixed part of the seat, and the seating part being part of the movable part of the seat. Similarly, the seat element which constitutes the movable part of the seat in one given situation may constitute the fixed part of the seat in another situation.

According to another non-limiting example, the fixed part of the seat comprises, for example, a track fixed to the floor of the aircraft. The movable part of the seat comprises for example several feet connected to the track so as to be able to slide along it.

One will note that in certain cases, the actuator used may be a linear actuator. In such cases, the shaft and the pinion(s) of the second assembly of the proposed transmission device may be replaced by a screw-nut system. Such a system comprises a screw extending along an axis which may be substantially parallel to the axis of extension of the housing, and a nut able of rotating about the axis of the screw. The nut is in particular driven to rotate about the axis of the screw, by the actuator's motor. The screw is connected to the movable part of the seat. The nut and the screw are connected such that rotation of the nut about the axis of the screw causes axial movement of the screw. The complementary first axial stop and/or the complementary second axial stop may then be comprised in faces of the nut which are arranged facing the first axial stop and/or the second axial stop of the first assembly. Alternatively, the complementary first axial stop and/or the complementary second axial stop are comprised in an additional part integral with the nut and arranged axially as a continuation of the nut, in particular in faces of this additional part which are arranged facing the first axial stop and/or the second axial stop of the first assembly. In the case of a linear actuator comprising a screw-nut system, the complementary first and second shoulders of the second assembly may be carried by the nut or by the additional part.

BRIEF DESCRIPTION OF DRAWINGS

Other features, details and advantages will become apparent from reading the detailed description below, and from analyzing the attached drawings, in which.

DESCRIPTION OF EMBODIMENTS

Figure 1:
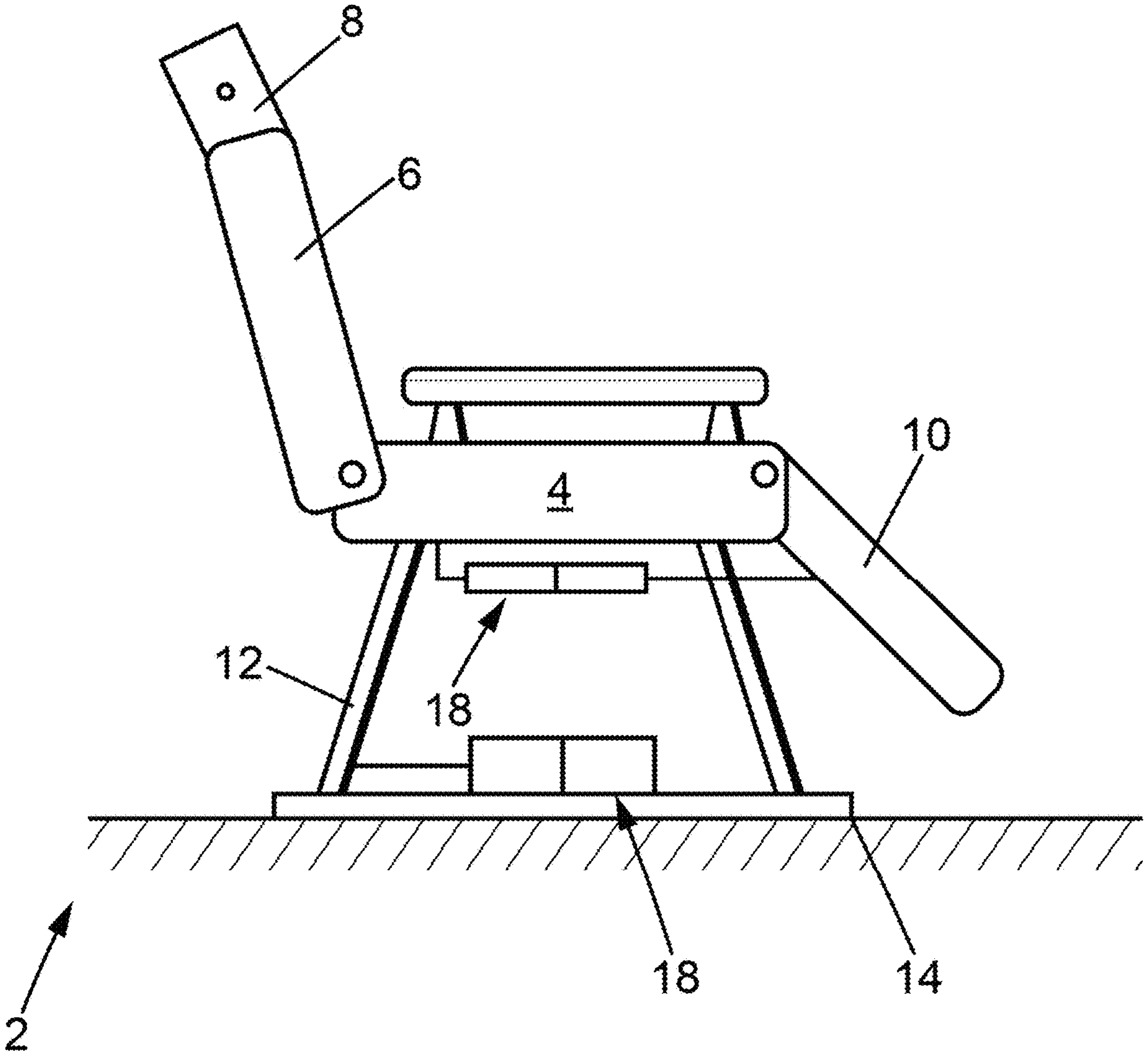
FIG. 1 shows a schematic side view of an aircraft seat provided with at least one actuator comprising a movement transmission device according to the invention.

FIG. 1 shows a seat 2, in particular for an aircraft. Seat 2 comprises a seating part 4, a backrest 6, and a headrest 8. Seat 2 may further comprise a leg rest 10.

Seat 2 is intended to be connected to a fixed part of the aircraft, in particular to the floor. For this purpose, seat 2 may comprise feet 12 and a track 14. Track 14 comprises, for example, two rails fixed to the floor, each foot 12 being mounted on one of the rails so as to be able to slide along the respective rail. Seat 2 is thus able to move forwards or backwards.

Seat 2 comprises one or more electric drive systems 18, also referred to as actuators. Each actuator 18 is dedicated to moving one of the elements (seating part 4, backrest 6, headrest 8, leg rest 10, etc.) of seat 2 relative to the others. Alternatively, actuator 18 is dedicated to moving seat 2 in track 14.

In the following, the element of seat 2 that is moved is called the "moving part", while the elements it moves relative to are called the "fixed part". When seat 2 is moved in its entirety relative to the fixed part of the aircraft, the "moving part" is seat 2, and the "fixed part" is the fixed part of the aircraft.

Figure 2:
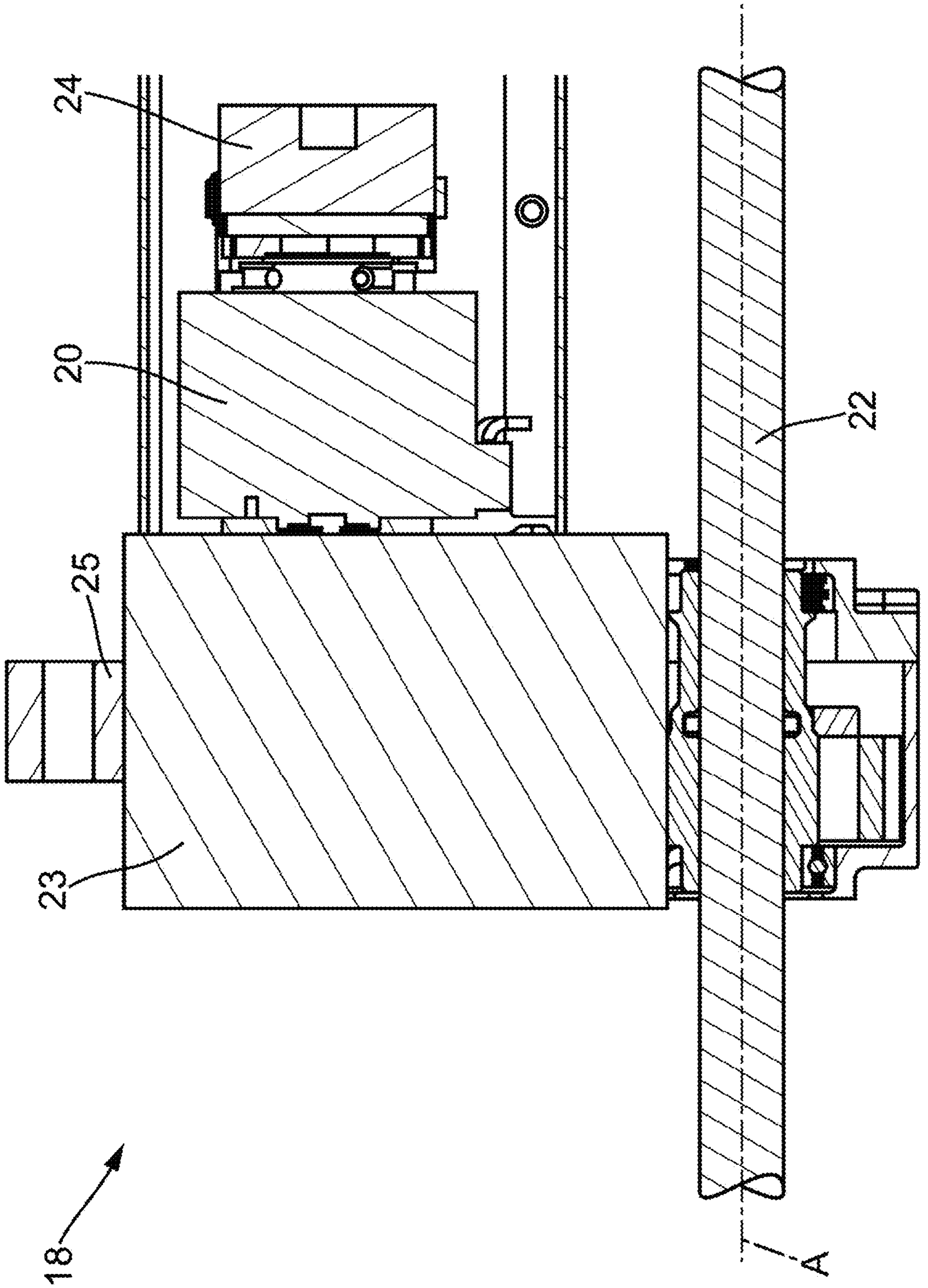
FIG. 2 shows a schematic view in axial section of an actuator of the seat of FIG. 1.

As can be seen in FIG. 2, actuator 18 comprises a motor 20, an output shaft 22, a reduction gear train 23, a brake 24, and a casing 25.

Motor 20 is able of generating a movement of a shaft of the actuator, referred to as the input shaft or drive shaft (not illustrated). Motor 20 generates in particular a rotational movement of the input shaft about a longitudinal axis of this input shaft. "Longitudinal" is understood here to mean extending along its longest dimension. The input shaft is integral with a pinion 240, referred to as the upstream pinion or input pinion, which will be described further below with reference to FIG. 3.

Output shaft 22 is configured to be driven to rotate about its longitudinal axis A. In particular, output shaft 22 is rotated when the input shaft rotates about its longitudinal axis as indicated above. Advantageously, the longitudinal axes of output shaft 22 and input shaft are substantially parallel. As will be detailed below, output shaft 22 is integral with a pinion 260 referred to as the downstream pinion or output pinion. The rotation of output shaft 22 about axis A causes movement, in rotation and/or in translation, of the movable part of seat 2. Output shaft 22 is thus configured to convert the rotation of the input shaft into a movement adapted to move the movable part relative to the fixed part of the seat.

Reduction gear train 23 is for example a multi-stage reduction gear train. Reduction gear train 23 comprises a set of mechanical parts, such as gear assemblies or connecting rods, adapted to transmit movement of the input shaft to output shaft 22. More specifically, these mechanical parts connect the input shaft to output shaft 22. Among these mechanical parts, reduction gear train 23 comprises a movement transmission device 30, in particular for transmission of the movement of the input shaft, which will be described below with reference to FIGS. 3 to 5.

Reduction gear train 23 makes it possible to reduce the movement speed of the input shaft before transmission to output shaft 22. The reduction in the movement speed generated by motor 20 is linked to an increase in the output torque of actuator 18.

Brake 24 is configured to brake or prevent the input shaft's rotation generated by motor 20, so as to also brake or prevent the rotation of output shaft 22, and therefore the movement of the movable part of seat 2 relative to its fixed part.

As can be seen from FIG. 2, casing 25 houses motor 20, brake 24, and reduction gear train 23. Output shaft 22 is connected to reduction gear train 23 and traverses casing 25 in its longitudinal direction A. Casing 25 is connected to the fixed part of seat 2.

Transmission device 30 will now be described, with reference to FIGS. 3 to 5.

Transmission device 30 comprises a first assembly 100 and a second assembly 200.

First assembly 100 comprises a housing 110 extending along an axis B. Advantageously, axis B is substantially parallel to the longitudinal axes of the input shaft and output shaft 22 of actuator 18. Housing 110 is for example comprised in casing 25, casing 25 therefore forming part of first assembly 100. Housing 110 may be delimited by a radially internal wall 27 of casing 25.

Housing 110 may comprise a first end portion 112, a second end portion 114, and a central portion 116. Central portion 116 is arranged axially between first end portion 112 and second end portion 114. In particular, central portion 116 is delimited axially between a first face 118 of radially internal wall 27 of casing 25 and a second face 120 of radially internal wall 27 of casing 25. First face 118 and second face 120 extend substantially radially. First face 118 and second face 120 each comprise a hole which places central portion 116 in communication with, respectively, first end portion 112 and second end portion 114. First end portion 112 extends between first face 118 and a first end 112A, while second end portion 114 extends between second face 120 and a second end 114A that is axially opposite first end 112A.

Advantageously, first end portion 112, second end portion 114, and central portion 116 have a generally cylindrical shape. In the figures, first end portion 112 and second end portion 114 have substantially the same diameter, without this being limiting. Central portion 116 of housing 110 has a greater diameter than the diameter of first and second end portions 112, 114.

Housing 110 may be closed off at one of its ends. In particular, as can be seen in FIG. 3, an end wall 115 extending substantially radially at one of the ends of the housing, in this case at second end 114A, closes off housing 110. Alternatively, as in FIGS. 4 and 5, housing 110 may be open at both of its ends 112A, 114A.

First assembly 100 may further comprise a first preload element 124 and a second preload element 130. In FIG. 3, first preload element 124 comprises a plug which is sized to be at least partially insertable into first end portion 112 of housing 110. The plug is in particular a plug of which a radially external surface comprises a thread (not shown) complementary to a threaded hole 150 provided in a fraction of radially internal wall 27 of the casing delimiting first end portion 112 of housing 110. In FIGS. 4 and 5, first preload element 124 is a nut comprising a thread (not shown) on a radially external surface, complementary to threaded hole 150. By means of threaded hole 150 and the complementary thread provided on first preload element 124, first preload element may be removably connected to housing 110. In addition, the axial position of first preload element 124 inside housing 110 may be adjusted by advancing first preload element 124 along threaded hole 150, by a rotational movement of first preload element 124 about axis B. In FIG. 3, second preload element 130 is a plate which is connected to second face 120 of radially internal wall 27 of casing 25, preferably removably. For example, plate 130 may be screwed onto second face 120 of the radially internal wall by screws 152. Advantageously, plate 130 comprises a hole having a dimension greater than or equal to the hole in face 120 of radially internal wall 27, which allows the arrangement of the plate on face 120 to neither completely nor partially block the hole which places second end portion 114 and central portion 116 of housing 110 in communication. In FIGS. 4 and 5, second preload element 130 is a nut similar to the nut of first preload element 124. In order to connect this nut to second end portion 114 of housing 110, a threaded hole (not shown) complementary to the thread of the radially external surface of the nut may be provided in a fraction of radially internal wall 27 of the casing delimiting second end portion 114 of housing 110. Of course, first preload element 124 could be a plate similar to plate 130 described above, and second preload element 130 could be a plug similar to that of first preload element 124 of FIG. 3.

First assembly 100 may further comprise a first shoulder 132 and a second shoulder 134. First shoulder 132 is comprised in first end portion 112 of housing 110, while second shoulder 134 is comprised in second end portion 114 of housing 110.

In some cases, first shoulder 132 and/or second shoulder 134 are formed by a portion of casing 25 projecting radially inside housing 110 from radially internal wall 27. In other cases, first shoulder 132 and/or second shoulder 134 are formed from the arrangement of a piece not part of casing 25, inside housing 110, such that at least a portion of this piece not part of casing 25 projects radially relative to radially internal wall 27. In the illustrated case, first shoulder 132 is formed by a portion projecting radially inside first end portion 112 of housing 110, from radially internal wall 27 of casing 25. In FIG. 3, second shoulder 134 is comprised in a portion of plate 130, this portion of plate 130 being arranged radially inside second end portion 114 of housing 110. More specifically, in FIG. 3, second shoulder 134 is formed by a portion of plate 130 projecting axially relative to the rest of the plate so as to be insertable into second end portion 114 of housing 110. Advantageously, this projecting portion of the plate is sized so as to be radially in contact with radially internal wall 27 in second end portion 114 of housing 110. In FIGS. 4 to 5, second shoulder 134 is formed by a portion projecting radially inside second end portion 114 of housing 110, from radially internal wall 27 of casing 25.

First shoulder 132 and second shoulder 134 have an annular shape for example. First shoulder 132 may comprise an annular face 136 which, as will be detailed below, is axially supported by a first bearing 270. Second shoulder 134 may comprise an annular face 138 which, as will be detailed below, is axially supported by a second bearing 280.

Figure 3:
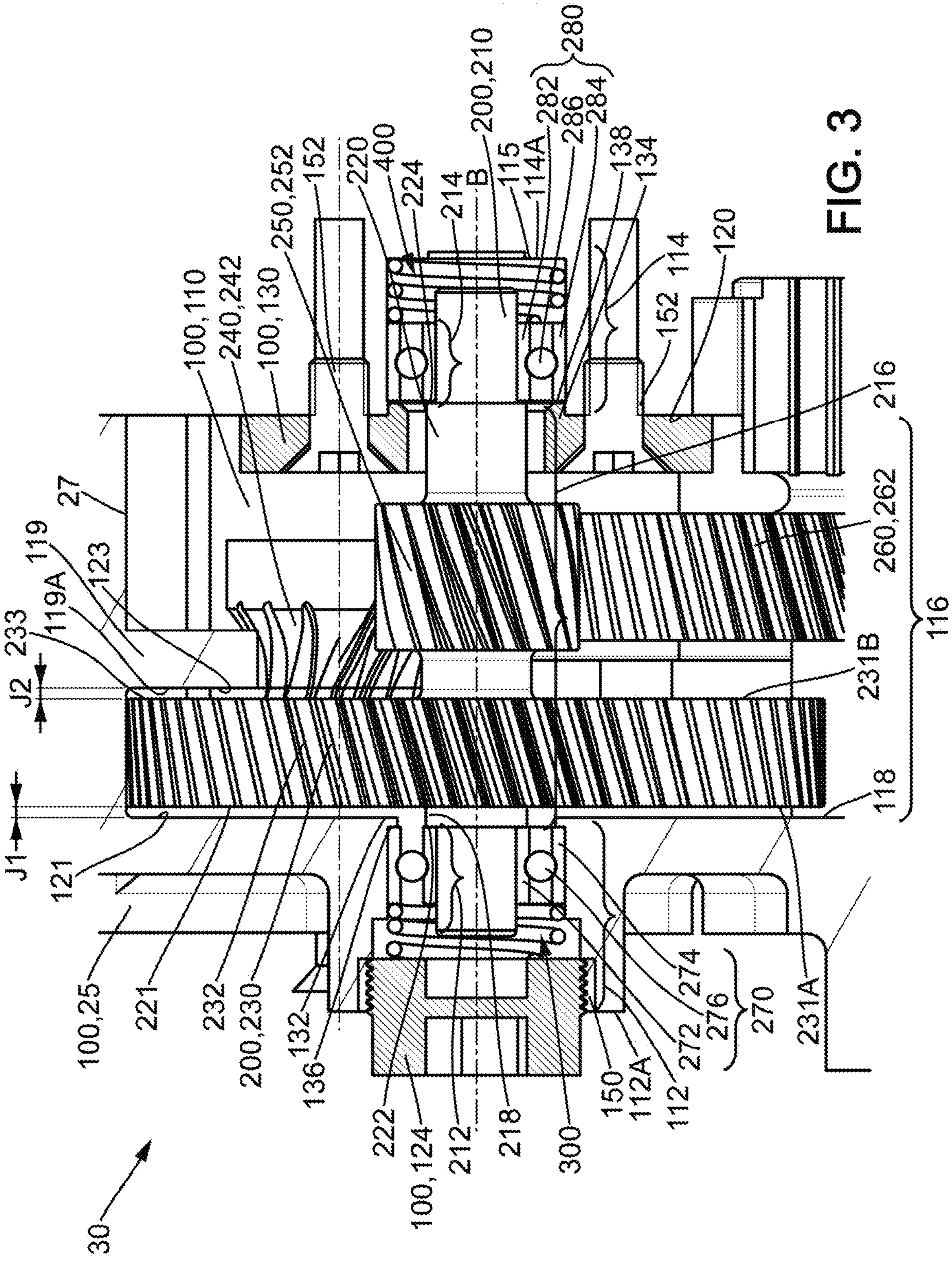
FIG. 3 shows a schematic view in axial section of the movement transmission device of the seat of FIG. 1 according to one embodiment of the invention.
Figure 4:
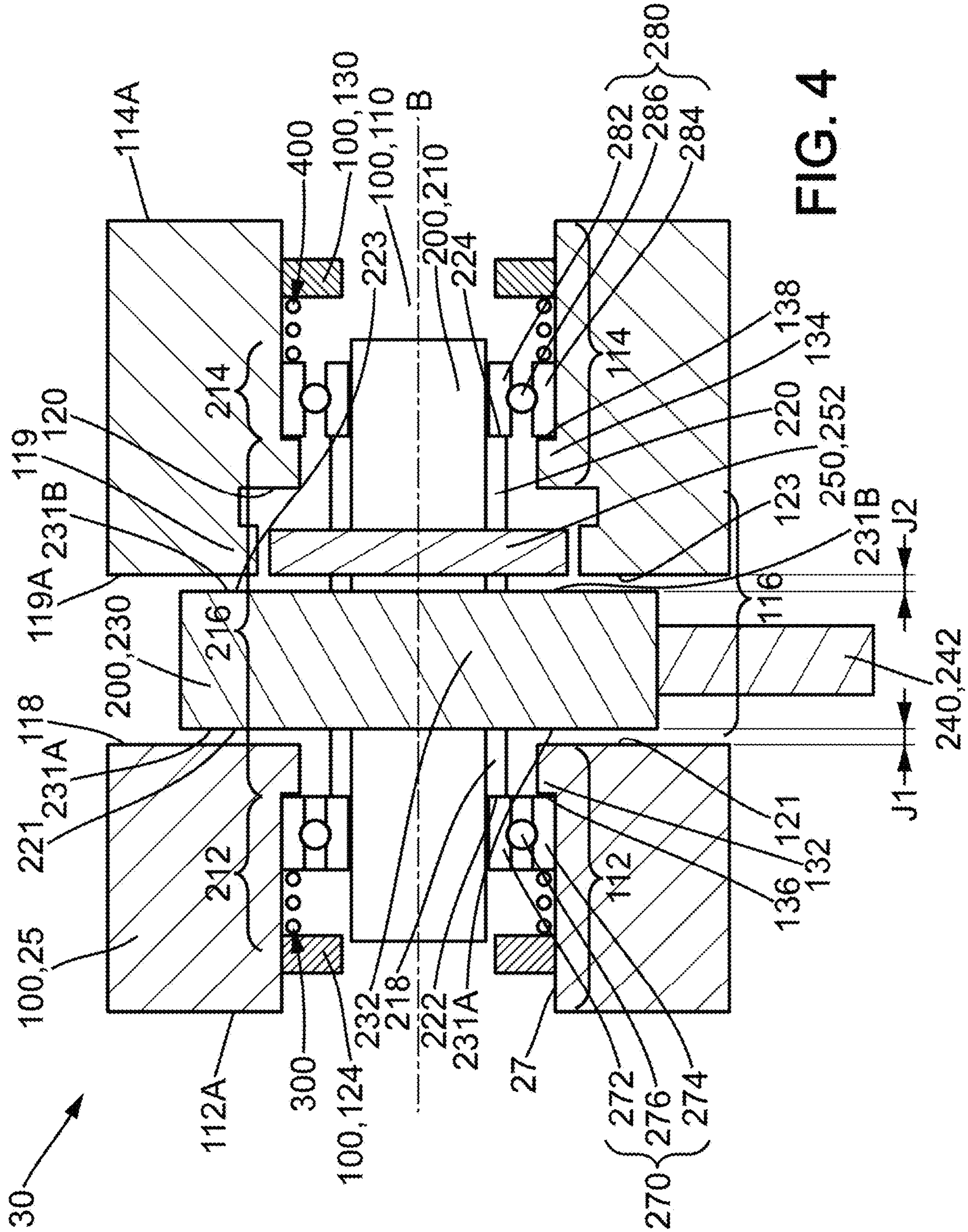
FIG. 4 shows a schematic view in axial section of the movement transmission device of the seat of FIG. 1 according to an alternative embodiment of the device of FIG. 3, the transmission device being in a first position.
Figure 5:
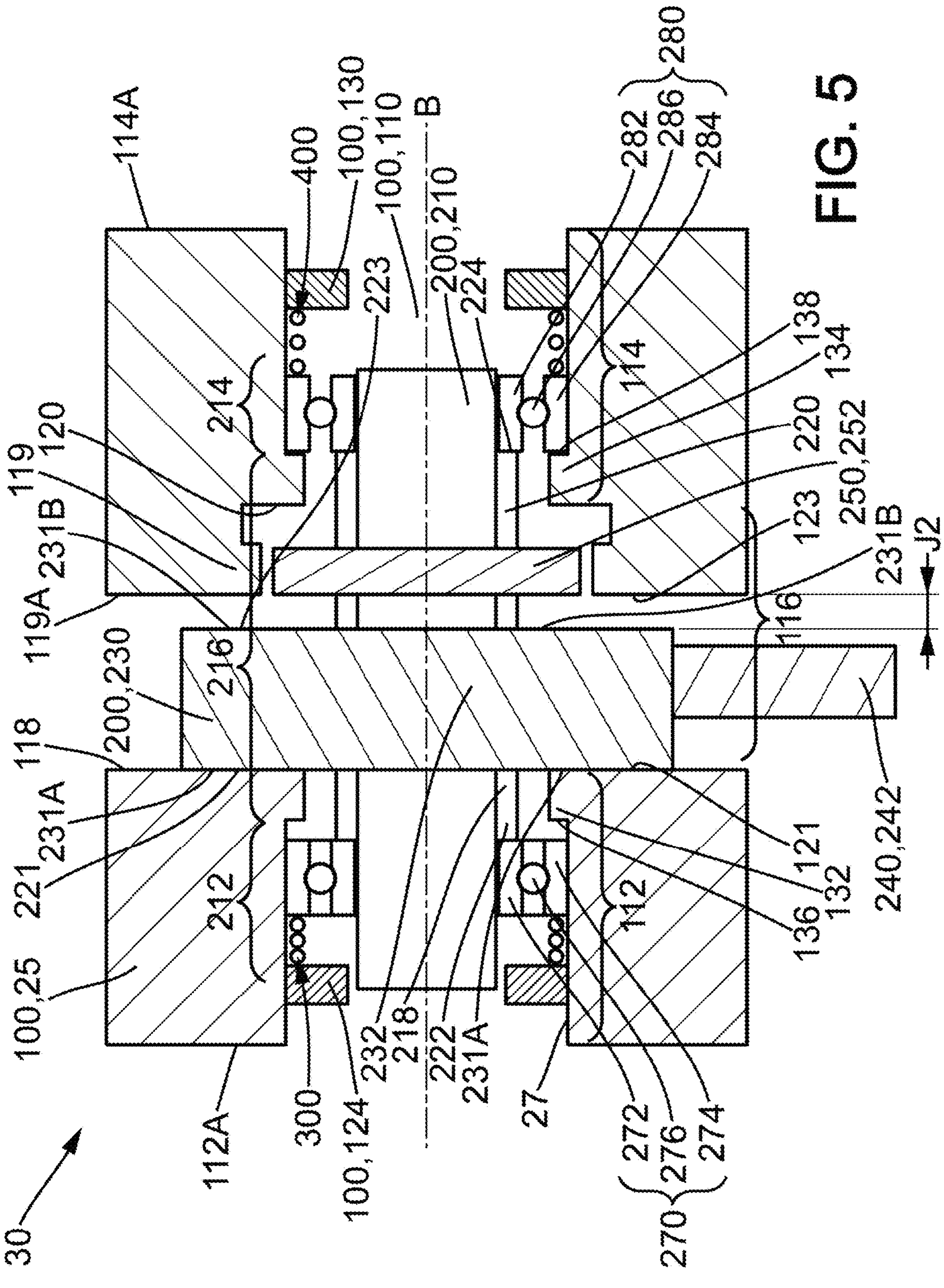
FIG. 5 shows a schematic view in axial section of the movement transmission device of the seat of FIG. 1 according to the variant embodiment of FIG. 4, in a second position.

As can be seen from FIGS. 3 to 5, a first elastic member 300 is housed in first end portion 112 of housing 110. A second elastic member 400 is housed in second end portion 114 of housing 110. First elastic member 300 and second elastic member 400 are arranged in housing 110 so as to be deformable in the axial direction, as will be detailed below.

In FIG. 3, first and second elastic members 300, 400 are a wave spring, without this being limiting.

Advantageously, first elastic member 300 and second elastic member 400 have a substantially hollow cylindrical shape or a substantially annular shape. A cavity or hole therefore axially traverses first and second elastic members 300, 400. A radially external diameter of first elastic member 300 is for example substantially equal to the diameter of first end portion 112 of the housing. A radially external diameter of second elastic member 400 is for example substantially equal to the diameter of second end portion 114 of the housing. A radially internal diameter of first elastic member 300 and a radially internal diameter of second elastic member 400 are advantageously chosen so as to allow at least a portion of second assembly 200 to move axially through first and second elastic members 300, 400, as will be detailed below.

As can be seen from FIGS. 3 to 5, second assembly 200 is housed in housing 110 of first assembly 100. Second assembly 200 comprises a shaft 210 and at least one helical pinion 230 which are housed in housing 110 of first assembly 100.

Shaft 210 has a generally cylindrical shape extending along axis B. Advantageously, shaft 210 has a substantially circular transverse cross-section. "Traverse" is understood here to mean comprised in a plane substantially perpendicular to axis B. Advantageously, the diameter of the cross-section of shaft 210 is, for the entire length of shaft 210, less than the diameter of first end portion 112 of housing 110, less than the diameter of second end portion 114 of housing 110, and less than the radially internal diameters of first and second elastic members 300, 400. Shaft 210 may thus move axially along each of end portions 112, 114 of housing 110, as well as along central portion 116 of housing 110.

The shaft comprises a first end portion 212, a second end portion 214, and a central portion 216. As can be seen from the figures, the diameter of the cross-section of shaft 210 in first end portion 212 and in second end portion 214 is less than the diameter of the cross-section of the shaft in central portion 216. Also, a first shoulder 218 is formed at the interface between first end portion 212 and central portion 216. Similarly, a second shoulder 220 is formed at the interface between second end portion 214 and central portion 216 of shaft 216. Alternatively, the cross-sections of first end portion 212, second end portion 214, and central portion 216 all have the same diameter. In this case, first shoulder 218 is formed by a portion of the shaft projecting radially relative to the remainder of shaft 210 at the interface between first end portion 212 and central portion 216 of shaft 210, and second shoulder 220 is formed by a portion of the shaft projecting radially relative to the remainder of shaft 210 at the interface between second end portion 214 and central portion 216 of shaft 210.

First shoulder 218 and second shoulder 220 have, for example, an annular shape. First shoulder 218 may comprise an annular face 222 which, as will be detailed below, axially supports first bearing 270. Second shoulder 220 may comprise an annular face 224 which, as will be detailed below, axially supports second bearing 280.

First shoulder 218 of the shaft is complementary to first shoulder 132 of first assembly 100. "Complementary" is understood here to mean that in a rest position of device 30, annular face 222 of first shoulder 218 of shaft 210 is preferably aligned in the radial direction with annular face 136 of first shoulder 132 of first assembly 100. Similarly, second shoulder 220 of shaft 210 is complementary to second shoulder 134 of first assembly 100. In the rest position of device 30, annular face 224 of second shoulder 220 of shaft 210 is therefore preferably aligned in the radial direction with annular face 138 of second shoulder 134 of first assembly 100. As will be detailed below, the rest position of device 30 corresponds to a position in which no axial force is exerted on first elastic member 300 and/or on second elastic member 400 by second assembly 200.

Helical pinion 230 is arranged around shaft 210. In the figures, helical pinion 230 is arranged around central portion 216 of shaft 210. Helical pinion 230 advantageously has an annular shape, with a hole (not visible) of a diameter substantially equal to the diameter of central portion 216 of shaft 210 axially traversing helical pinion 230. Shaft 210 is thus press-fitted or adjusted to fit tightly into the hole of helical pinion 230, which makes it possible to make integral the movements of shaft 210 and the helical pinion, as will be detailed below. Pinion 230 comprises a first face 231A and a second face 231B which are axially opposed.

Helical pinion 230 is in particular arranged in central portion 116 of housing 110. In the figures, helical pinion 230 is arranged between first face 118 of radially internal wall 27 of casing 25 and an intermediate wall 119 projecting radially into central portion 116 of housing 110 from radially internal wall 27 of the casing. Wall 119 comprises a first face 119A which is axially directly opposite first face 118 of radially internal wall 27 when second assembly 200 is not installed in housing 110.

A radially external diameter of helical pinion 230 is chosen such that at least a portion of first face 231A of helical pinion 230 is axially facing first face 118 of radially internal wall 27 of the casing. Similarly, the radially external diameter of helical pinion 230 is chosen so that at least a portion of second face 231B of helical pinion 230 is axially facing first face 119A of intermediate wall 119.

Advantageously, first face 118 of radially internal wall 27 and first face 119 of intermediate wall 119 are separated by a distance allowing, in the rest position of device 30, the formation of a first axial clearance J1 and a second axial clearance J2 between pinion 230 and faces 118, 119A. In particular, as can be seen in FIGS. 3 and 4, first axial clearance J1 is formed axially between first face 231A of pinion 230 and first face 118 of radially internal wall 27 of casing 25. Second axial clearance J2 is formed axially between second face 231B of pinion 230 and first face 119A of intermediate wall 119.

A radially external face 232 of helical pinion 230 comprises a plurality of teeth oriented so as to form an angle with axis B, referred to as the helix angle, that is not 0° or 90°. When device 30 is installed in actuator 18, radially external face 232 of helical pinion 230 is meshed with a complementary input pinion 240, in particular with a radially external face 242 of input pinion 240. As it is clear from FIG. 3, radially external face 240 of the input pinion is provided with teeth. The helix angle of input pinion 240 is advantageously equal to the helix angle of helical pinion 230 in order to ensure correct meshing between helical pinion 230 and input pinion 240. Input pinion 240 is in particular a pinion connected to the drive shaft of actuator 18, so that input pinion 240 moves integrally with the drive shaft.

Second assembly 200 may further comprise a second pinion 250 press-fitted or adjusted to fit tightly around shaft 210. The movements of shaft 210 and second pinion 250 are thus integral. Second pinion 250 may have an annular shape similar to the shape of helical pinion 230, but, as can be seen from the figures, it may have a radially external diameter that is smaller than the radially external diameter of helical pinion 230.

A radially external face 252 of second pinion 250 comprises a plurality of teeth. Second pinion 250 may be a helical pinion (helix angle that is not 0° or) 90° or a spur pinion. In the case of a spur pinion, the teeth of radially external face 252 form, with axis B, an angle equal to 0° or 90°.

When second pinion 250 is a helical pinion, the helix angle of second pinion 250 may be equal to or different from the helix angle of helical pinion 230. Preferably, the helix angle of helical pinion 230 and of pinion 250 are in opposite directions, without this being limiting.

As can be seen in FIG. 3, when device 30 is installed in actuator 18, radially external face 252 of second pinion 250 meshes with a complementary output pinion 260, in particular with a radially external face 262 of output pinion 260. As is clear from FIG. 3, radially external face 262 of output pinion 260 is provided with teeth. The angle formed between the teeth of output pinion 260 and axis B is advantageously equal to the angle formed between the teeth of second pinion 250 and axis B, in order to ensure correct meshing between second pinion 250 and output pinion 260. Output pinion 260 is in particular a pinion connected to output shaft 22 of actuator 18, such that output pinion 260 moves integrally with output shaft 22.

Second assembly 200 may further comprise first bearing 270 and second bearing 280. First bearing 270 comprises a radially internal ring 272 and a radially external ring 274. A plurality of rolling elements 276 are arranged circumferentially between rings 272 and 274 of first bearing 270. Second bearing 280 comprises a radially internal ring 282 and a radially external ring 284. A plurality of rolling elements 286 are arranged circumferentially between rings 282 and 284 of second bearing 280. In the figures, bearings 270, 280 comprise a single circumferential row of rolling elements 276, 286, but several rows of radially-distributed rolling elements may be provided.

First bearing 270 is arranged around first end portion 212 of shaft 210. In the rest position of device 30, radially external ring 274 of first bearing 270 is axially supported on first shoulder 132 of the first assembly, in particular on annular face 136 of first shoulder 132. Radially internal ring 272 of first bearing 270 is axially supported on complementary first shoulder 218 of shaft 210, in particular on annular face 222. In the rest position of device 30, radially external ring 284 of second bearing 280 is axially supported on second shoulder 134 of the first assembly, in particular on annular face 138 of said second shoulder 134. Radially internal ring 282 of second bearing 280 is axially supported on complementary second shoulder 220 of shaft 210, in particular on annular face 224.

Radially internal ring 272, 282 of each bearing 270, 280 may be configured to rotate integrally with shaft 210 about axis B.

As is clearly apparent from FIGS. 3 to 5, first elastic member 300 is axially supported on radially external ring 274 of first bearing 270, and second elastic member 400 is axially supported on radially external ring 284 of second bearing 280.

In FIG. 3, first elastic member 300 is arranged axially between first preload element 124 and first bearing 270, while second elastic member 400 is arranged axially between second bearing 280 and end wall 115 of housing 110. In FIGS. 4 and 5, first elastic member 300 is arranged similarly to FIG. 3, but second elastic member 400 is arranged axially between second bearing 280 and second preload element 130.

Due to first preload element 124, it is possible to create a first axial preload force which acts on first elastic member 300. In particular, when first preload element 124 is a plug or a nut as described above, the first axial preload force may be created and adjusted by the movement of first preload element 124 along threaded hole 150. When first preload element 124 is moved along threaded hole 150 towards first elastic member 300, first elastic member 300 is compressed, which increases the first axial preload force acting on elastic member 300. Conversely, when first preload element 124 is moved along threaded hole 150 in the opposite direction to first elastic member 300, first elastic member 300 relaxes, which reduces the first axial preload force acting on elastic member 300. If first preload element 124 is a plate such as the plate described above with reference to FIG. 3, the plate is sized so as to induce a given value of the first axial preload force when the plate is installed in housing 110. More precisely, the length of a portion of the plate projecting axially for insertion into first end portion 112 of housing 110 may be chosen so as to subject first elastic member 300 to the predetermined value of the first axial preload force.

Similarly, by means of second preload element 130, it is possible to create a second axial preload force which acts on second elastic member 400. In particular, when second preload element 130 is a plug or a nut as described above, the second axial preload force may be created and adjusted by the movement of second preload element 130 along the threaded hole provided in second end portion 114 of housing 110. If second preload element 130 is the plate of FIG. 3, the plate is sized so as to induce a given value of the second axial preload force when the plate is installed in housing 110. More precisely, the length of the portion of the plate projecting axially for insertion into the second end portion of housing 110 may be chosen so as to subject second elastic member 400 to the predetermined value of the second axial preload force.

One will note that the first axial preload force and the second axial preload force may be different from each other.

An operating mode of transmission device 30 will now be explained.

As indicated above, input pinion 240 moves integrally with the drive shaft of actuator 18. As was also explained, input pinion 240 and helical pinion 230 are two complementary helical pinions which engage in a helical meshing. Such meshing generates an axial force on the pinions which interact when torque is transmitted between these pinions.

When the drive shaft is driven by motor 20 to rotate about its longitudinal axis, input pinion 240 is also driven to rotate about this axis. The meshing of input pinion 240 with helical pinion 230 causes the helical pinion to also be rotated about axis B when input pinion 240 rotates. As shaft 210 is integral with helical pinion 230, shaft 210 is also driven to rotate about axis B.

Because the meshing between helical pinion 230 and input pinion 240 is helical, transmission of torque from input pinion 240 to helical pinion 230 generates an axial force in helical pinion 230 which causes axial movement of helical pinion 230 in the direction of this axial force. The helical meshing may also generate an opposite axial force in input pinion 240 which causes axial movement of input pinion 240 in a direction opposite to the direction of the axial force generated in helical pinion 230.

When the axial force generated in helical pinion 230 of second assembly 200 is oriented towards first elastic member 300, second assembly 200 moves axially towards first elastic member 300. The contact between first shoulder 218 and radially internal ring 272 of the first bearing causes the axial force generated in helical pinion 230 to be transmitted to first bearing 270. In particular, the axial force is transmitted to radially internal ring 274 of bearing 270. Radially internal ring 272 is then moved axially, integrally with second assembly 200. The axial force is then transmitted to radially external ring 274 of the first bearing, through rolling elements 276.

As indicated above, first elastic member 300 is axially supported on radially external ring 274 of first bearing 270. As was also indicated above, a first axial preload force acts on first elastic member 300. When the axial force generated in helical pinion 230 and transmitted to radially external ring 274 of the first bearing is less than or equal to the first axial preload force, first elastic member 300 opposes the axial movement of radially external ring 274 of first bearing 270 due to the axial force. The axial movement of second assembly 200 is thus stopped. When the axial force generated in helical pinion 230 and transmitted to radially external ring 274 of the first bearing is greater than the first axial preload force, first elastic member 300 cannot oppose the axial movement of radially external ring 274 of first bearing 270 due to the axial force generated in helical pinion 230. Radially external ring 274 therefore moves axially, which compresses first elastic member 300. The first axial preload force thus defines a first axial preload force threshold beyond which first elastic member 300 is compressed due to the axial movement of second assembly 200 under the effect of the axial force generated in helical pinion 230.

Because of the compression of first elastic member 300, the second assembly may continue its axial movement towards first elastic member 300. First axial clearance J1 is thus progressively reduced until first face 118 of radially internal wall 27 of casing 25 and first face 231A of helical pinion 230 come into contact with each other, as illustrated in FIG. 5. First face 118 therefore comprises a first axial stop 121, and first face 231A of helical pinion 230 therefore comprises a complementary first axial stop 221. The contact between first axial stop 121 and complementary first axial stop 221 makes it possible to dissipate some or all of the axial force generated in helical pinion 230, through casing 25.

When the axial force generated in helical pinion 230 of second assembly 200 is oriented towards second elastic member 400, the operation of the transmission device is similar to when the axial force generated in helical pinion 230 is oriented towards first elastic member 300. However, in such case, second assembly 200 is moved axially towards second elastic member 400. The contact between second shoulder 220 and radially internal ring 282 of second bearing 280 causes the axial force generated in helical pinion 230 to be transmitted to second bearing 280. In particular, the axial force is transmitted to radially internal ring 282 of bearing 280. Radially internal ring 282 is then moved axially, integrally with second assembly 200. The axial force is then transmitted to radially external ring 282 of the second bearing, through rolling elements 286.

When the axial force generated in helical pinion 230 and transmitted to radially external ring 282 of the second bearing is less than or equal to the second axial preload force, second elastic member 400, which as explained is axially supported on radially external ring 282 of second bearing 280, opposes the axial movement of radially external ring 282 under the effect of the axial force. The axial movement of second assembly 200 is thus stopped. When the axial force generated in helical pinion 230 and transmitted to radially external ring 282 of the second bearing is greater than the second axial preload force, second elastic member 400 cannot oppose the axial movement of radially external ring 282 of second bearing 280 under the effect of the axial force generated in helical pinion 230. Radially external ring 282 therefore is moved axially so as to compress second elastic member 400. The second axial preload force thus defines a second axial preload force threshold beyond which second elastic member 400 is compressed because of the axial movement of second assembly 200 under the effect of the axial force generated in helical pinion 230.

Due to the compression of second elastic member 400, the second assembly can continue its axial movement towards second elastic member 400. Second axial clearance J2 is thus progressively reduced until first face 119A of intermediate wall 119 and second face 231B of helical pinion 230 come into contact with each other. First face 119A therefore comprises a second axial stop 123, and second face 231B of helical pinion 230 therefore comprises a complementary second axial stop 223. The contact between second axial stop 123 and complementary second axial stop 223 makes it possible to dissipate some or all of the axial force generated in helical pinion 230, through casing 25.

One will note that any reduction in first axial clearance J1 implies an increase in second axial clearance J2, as can be seen in FIG. 5. Similarly, any reduction in second axial clearance J2 implies an increase in first axial clearance J1.

By means of the device described above, the axial forces generated within actuator 18 are dissipated through first assembly 100 of transmission device 30 when the forces are very significant, in particular when they exceed the first or second axial force threshold described above. The percentage of the forces generated in actuator 18 which reach brake 24 is therefore reduced or even zero. Consequently, the risks of wear and/or breakage of brake 24 are limited.

This disclosure is not limited to the examples of transmission devices described above solely by way of example, but encompasses all variants conceivable to a person skilled in the art within the context of the protection sought For example, as indicated above, the transmission device could comprise a single elastic member. In this case, only one preload element and one bearing are included in device 30. Furthermore, first axial stop 121 and second axial stop 123 could project axially relative to the remainder of respective wall 118 and wall 119A which comprises them. Similarly, complementary first axial stop 221 and complementary second axial stop 223 could project axially relative to the remainder of respective wall 231A and wall 231B which comprises them. According to another variant, at least one among the first axial stop and the complementary first axial stop and/or at least one among the second axial stop and the complementary second axial stop may comprise a friction surface containing roughnesses and/or axially projecting elements, for example a dog system. As indicated above, by means of the roughnesses and/or radially protruding elements, dissipation of the axial force through first assembly 100 is increased.

The invention claimed is:

1. A movement transmission device (30) intended for an actuator (18), the device (30) comprising:

a fixed first assembly (100), comprising a housing (110) extending along a first axis (B);

a second assembly (200) arranged in said housing (110) and extending along the first axis (B), the second assembly (200) being configured to move in rotation about said first axis (B) and to move in translation along said first axis (B), inside said housing (110); and a first elastic member (300) installed inside said housing (110);

wherein the first assembly (100) comprises a first axial stop (121) and the second assembly (200) comprises a complementary first axial stop (221), the first axial stop (121) and the complementary first axial stop (221) being axially facing each other, a first axial clearance (J1) being formed between the first axial stop (121) and the complementary first axial stop (221), wherein the first elastic member (300) is able of being deformed during translational movement of the second assembly (200) along the first axis (B) in a first direction when an axial force greater than a first threshold is exerted by the second assembly (200) on said first elastic member (300), the first axial clearance being progressively reduced until the complementary first axial stop (221) is axially supported on the first axial stop (121).

2. The device (30) according to claim 1, wherein the second assembly (200) comprises at least one shaft (210) and one helical pinion (230) which are integral with each other, the helical pinion (230) comprising the complementary first axial stop (221) and meshing with a complementary input pinion (240) of the device (30).

3. The device (30) according to claim 1, wherein a first bearing (270) is mounted in the housing (110), radially between the first assembly (100) and the second assembly (200), the first bearing (270) comprising a radially external ring (274) arranged facing the first assembly (100) and a radially internal ring (272) arranged facing the second assembly (200), the first elastic member (300) being axially supported on the radially external ring (274) of said first bearing.

4. The device (30) according to claim 3, wherein the first assembly (100) comprises a first shoulder (132) and the second assembly (200) comprises a complementary first shoulder (218), the radially external ring (274) of the first bearing (270) being axially supported on the first shoulder (132) of the first assembly (100), the radially internal ring (272) of the first bearing (270) being axially supported on the complementary first shoulder (218) of the second assembly (200).

5. The device (30) according to claim 1, further comprising a first preload element (124) for the first elastic member (300), able to adjust an axial preload force acting on the first elastic member (300).

6. The device (30) according to claim 5, further comprising a second elastic member (400) installed inside the housing (110), wherein the first assembly (100) comprises a second axial stop (123) and the second assembly comprises a complementary second axial stop (223), the second axial stop (123) and the complementary second axial stop (223) being axially facing each other, a second axial clearance (J2) being formed between the second axial stop (123) and the complementary second axial stop (223), wherein the second elastic member (400) is able to be deformed during translational movement of the second assembly (200) along the first axis in a second direction that is opposite to the first direction when an axial force greater than a second threshold is exerted by the second assembly (200) on said second elastic member (400), the second axial clearance (J2) being progressively reduced until the complementary second axial stop (223) is axially supported on the second axial stop (123).

7. The device (30) according to claim 6, further comprising a second bearing (280) mounted in the housing (110), radially between the first assembly (100) and the second assembly (200), the second bearing (280) comprising a radially external ring (284) arranged facing the first assembly (100) and a radially internal ring (282) arranged facing the second assembly (200), the second elastic member (400) being axially supported directly on the radially external ring (284) of said second bearing (280).

8. The device (30) according to claim 7, wherein the first assembly (100) further comprises a second shoulder (134) and the second assembly (200) further comprises a complementary second shoulder (220), the radially external ring (284) of the second bearing (280) being axially supported on the second shoulder (134) of the first assembly (100), the radially internal ring (282) of the second bearing (280) being axially supported on the complementary second shoulder (220) of the second assembly (200).

9. The device (30) according to claim 6, further comprising a second preload element (130) for the second elastic member (400), able to adjust an axial preload force acting on the second elastic member (400) independently of the axial preload force acting on the first elastic member (300).

10. A seat (2) for an aircraft, comprising:

a fixed part intended to be fixed to a fixed part of the aircraft and a movable part able to be moved relative to the fixed part, and the movement transmission device (30) according to claim 1 mounted between the movable part and the fixed part, the first assembly (100) of the transmission device being connected to said fixed part of the seat (2), the second assembly (200) of the transmission device being adapted to be driven by a motor (20) to move in rotation about the first axis (B) and in translation along said first axis (B), the second assembly (200) being connected to said movable part of the seat (2).

* * * * *